United States Patent [19]

Masuda

[11] Patent Number: 4,614,573
[45] Date of Patent: Sep. 30, 1986

[54] METHOD FOR PRODUCING AN OZONE GAS AND APPARATUS FOR PRODUCING THE SAME

[76] Inventor: Senichi Masuda, 3-2-1-415, Nishigahara, Kita-ku, Tokyo, Japan

[21] Appl. No.: 730,754

[22] Filed: May 3, 1985

[30] Foreign Application Priority Data

May 9, 1984 [JP] Japan .................................. 59-92464

[51] Int. Cl.⁴ .............................................. C01B 13/10
[52] U.S. Cl. ................................ 204/176; 422/186.04; 422/186.18; 422/186.19
[58] Field of Search .................. 204/176; 422/186.04, 422/186.19, 186.18

[56] References Cited

U.S. PATENT DOCUMENTS

| | | | |
|---|---|---|---|
| 2,704,274 | 3/1955 | Allison | 204/176 |
| 2,732,338 | 1/1956 | Moody | 204/176 |
| 2,936,279 | 5/1960 | Rindtorff et al. | 204/176 |
| 3,654,126 | 4/1972 | McNabney et al. | 204/176 |

Primary Examiner—R. L. Andrews
Attorney, Agent, or Firm—Price, Heneveld, Huizenga & Cooper

[57] ABSTRACT

A method for producing an ozone gas and an apparatus for producing the same are disclosed, in which a gas to be ozonized is fed to an ozonizer having a dielectric interposed between a pair of electrodes which are respectively connected to a high-frequency high-voltage power supply and thereby an ozone gas can be produced efficiently. The density of the gas to be ozonized which is fed to a silent discharge generating region in the ozonizer is made higher than the density of the same gas in the standard state. To that end, the temperature at the silent discharge generating region is lowered, and/or the pressure at the same region is increased.

18 Claims, 5 Drawing Figures

METHOD FOR PRODUCING AN OZONE GAS AND APPARATUS FOR PRODUCING THE SAME

BACKGROUND OF THE INVENTION

1. Field of the Invention:

The present invention relates to a method for producing an ozone gas that is available for pasteurization, sterilization, bleaching or the other general oxidation, and an apparatus for producing the same, that is, an ozonizer.

More particularly, the invention relates to a method and an apparatus for producing an ozone gas, in which air or oxygen is fed into a silent discharge generating region or a corona discharge generating region of an electric field device having a layer formed of dielectric such as glass, alumina ceramic or the like disposed between a pair of electrodes and thereby they are ozonized.

2. Description of the Prior Art:

Heretofore, in the above-described type of method and apparatus, a high voltage power supply is connected between a linear electrode and a two-dimensional electrode forming the above-mentioned pair of electrodes or between one two-dimensional electrode and another two-dimensional electrode forming the pair of electrodes to generate a silent discharge or a corona discharge in the space zone between these electrodes, and consequently, an ionic current flows through the discharge generating region in this space zone and thus ozonizes the gas to be ozonized, that is, the oxygen gas present in this region. However, due to heat generating phenomena during that process, the gas to be ozonized is expanded, hence the density of the gas becomes lower than that in the standard state before the above-described ionic current begins to flow through the region, and consequently, an ozone generating efficiency is lowered.

In order to prevent this, heretofore, cooling was effected so as to bring the temperature at the silent discharge or corona discharge generating region of the above-described electric field device back to the proximity of the temperature of the atmospheric air before heat is generated in that region, that is, the temperature of the atmospheric air under the standard state, through forcible cooling by water-cooling the electric field device or by forming cooling fins or the like on the outside of the electric field device.

However, since heat is continuously generated during discharge in the silent discharge or corona discharge generating region, it was as a practical matter difficult to lower the temperature in this region to the temperature of air in the standard state before commencement of the discharge, that is, before commencement of the operation of the apparatus, and so it was compelled to operate the apparatus at about 60° C.

Therefore, the ozone generating efficiency was about 5%, and it was considered impossible to raise the efficiency up to a higher value.

SUMMARY OF THE INVENTION

The inventor of this invention has experimentally discovered the fact that the ozone generating efficiency can be raised by increasing the density of the gas to be ozonized.

It is therefore one object of the present invention to remarkably improve the ozone generating efficiency in the method for producing an ozone gas and the apparatus for producing the same in the prior art.

According to one feature of the present invention, there is provided a novel method for producing an ozone gas including the step of feeding a gas to be ozonized having a higher density than its density in the standard state into a silent discharge generating region of an electric field device in which a pair of electrodes are disposed with a dielectric intervening therebetween as opposed to each other.

According to another feature of the present invention, there is provided a novel ozonizer comprising an electric field device as described above and density increasing means for making the density of the gas to be ozonized in the corona discharge generating region of the electric field device larger than that in the standard state.

The above-mentioned object and features of the present invention will be understood in more detail by reference to the following description taken in conjunction with the accompanying drawings.

BRIEF DESCRIPTION OF THE DRAWINGS

Three preferred embodiments of the present invention are illustrated in the accompanying drawings, wherein:

FIG. 4 is a longitudinal cross-section view of still another preferred embodiment; and FIG. 5 is a transverse cross-section view taken along line V—V in FIG. 4 as viewed in the direction of arrows.

DETAILED DESCRIPTION OF THE PREFERRED EMBODIMENT

Figure 1:
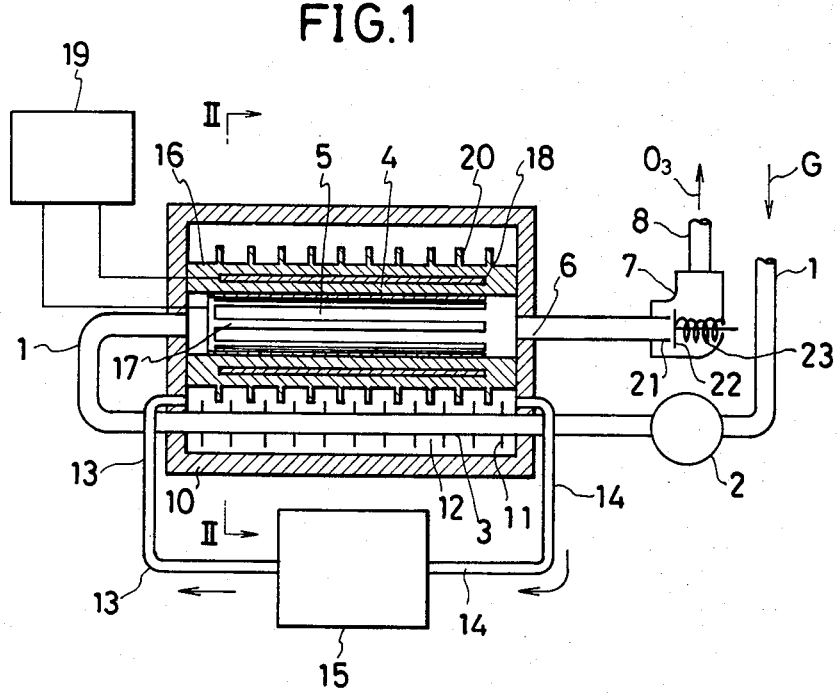
FIG. 1 is a longitudinal cross-section view of one preferred embodiment.
Figure 2:
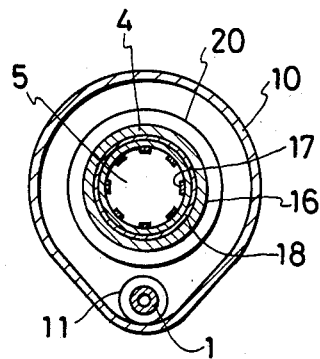
FIG. 2 is a transverse cross-section view taken along line II—II in FIG. 1 as viewed in the direction of arrows.

As shown in FIGS. 1 and 2, according to a first preferred embodiment of the present invention, a gas G to be ozonized such as air or an oxygen gas is fed from a feed pipe 1 through a pressurizing pump 2 and a cooling device 3 into a silent discharge generating region 5 of an electric field device 4. During this period, the gas G to be ozonized is pressurized by the pressuring pump 2 and cooled by the cooling device 3 to make the density of the gas G higher than that in the standard state.

The gas G to be ozonized which has been made to have a high density in the above-described manner, is subjected to silent discharge or corona discharge generated in the silent discharge generating region 5 to produce an ozone gas $O_3$, and the produced ozone gas is delivered to the outside through an outlet 6, a pressure regulating device 7 and an ozone gas pipe 8.

In the cooling device 3, cooling fins are provided on the outer periphery of the feed pipe 1, and the portion of the cooling fins is adapted to be cooled by a refrigerant 12 which circulates in a heat insulative casing 10.

Here, the refrigerant 12 is adapted to be cooled by a refrigerator 15, then fed into the heat insulative casing 10 through an inlet pipe 13, and again returned to the refrigerator 15 through an outlet pipe 14.

In the above-referred electric field device 4, linear discharge electrodes 17 are provided on an inner surface of a cylindrical dielectric 16 made of alumina ceramic or glass, two-dimensional induction electrode 18 is provided within the thickness of the cylindrical dielectric 16, and a high-frequency high-voltage power supply 19 is connected to the respective electrodes 17 and 18 to generate creeping corona discharge along the inner surface of the cylindrical dielectric 16. However, even if the induction electrode 18 is provided on the outside of the cylindrical dielectric 16, a similar effect can be realized.

In addition, cooling fins 20 are formed on the outer peripheral surface of the cylindrical dielectric 16, and the linear electrodes 17 and the silent discharge generating region 5 are cooled by cooling these cooling fins 20 with a coolant medium 12.

In the pressure regulating device 7, a poppet valve 22 is normally held in pressure contact with a valve seat 21 by a resilient force of a coil spring 23, and when the pressure of the ozone gas within the silent discharge generating region 5 becomes higher than a predetermined pressure, the poppet valve 22 is opened by the gas pressure against the resilient force of the coil spring 23, so that the ozone gas $O_3$ is exhausted towards an ozone gas container or the like not shown, and thereby the pressure in the silent discharge generating region 5 can be always held at a predetermined pressure or lower.

As described above, according to the present invention, the gas G to be ozonized is fed into the silent discharge generating region 5 while maintaining the density of the gas at a higher density than that in the standard state, and silent discharge is generated in this region 5. Hence, the probability of collision of the electron produced at that time against the molecules of the gas G to be ozonized per unit travelling path length is increased, and consequently, an ozone generating efficiency is raised.

For instance, the ozone generating efficiency in the case where the density of the gas to be ozonized is increased by lowering the temperature at the silent discharge generating region 5 to minus 100° C., becomes higher than about 5 times as compared to the case where the operation was started at the temperature of the standard state and the temperature in the silent discharge region 5 has been raised up to 60° C.

Figure 3:
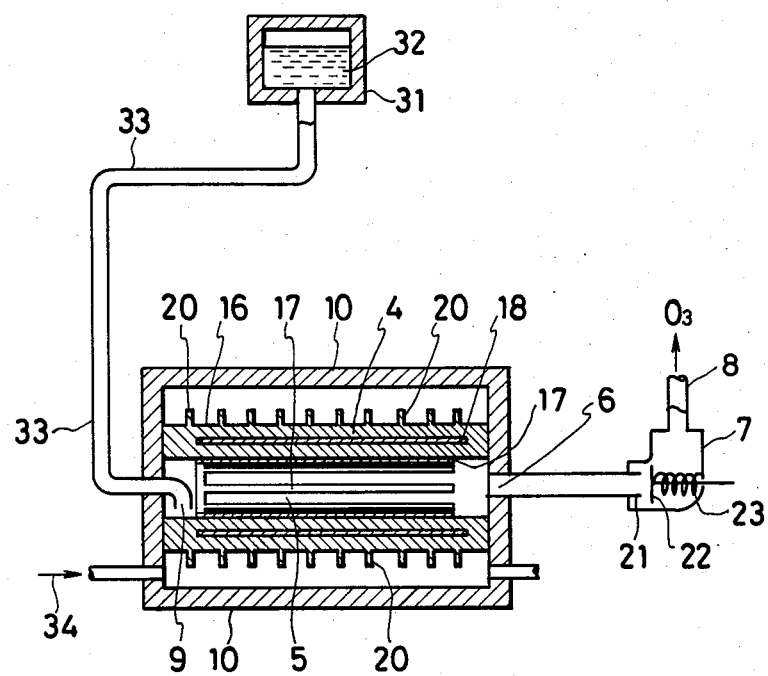
FIG. 3 is a longitudinal cross-section view of another preferred embodiment.

While the present invention has been described above with reference to FIGS. 1 and 2, it should not be limited to the embodiment illustrated in these figures, but it can be embodied by making replacement and/or addition of practical technical means within the scope of the above-described essence of the invention. For instance, in place of increasing the density of the gas G to be ozonized by cooling it in the cooling device 3 as shown in FIG. 1, it is also possible that as shown in FIG. 3, liquid oxygen 32 is directly fed from a liquid oxygen tank 31 through a pipe 33 to an interior 9 of an inlet of the electric field device 4 to be dropped down, then it is evaporated here into a pure oxygen gas, at the same time the electric field device itself is forcibly cooled by the latent heat of evaporation, and the produced oxygen gas is fed to the silent discharge or corona discharge generating region 5 to produce an ozone gas under the influence of the discharge. At that moment, an appropriate coolant medium 34 such as, for example, liquid nitrogen or the like could be fed into the heat insulative casing 10 to cool the cooling fins 20 on the outside of the electric field device.

Or else, although not illustrated in the drawings, instead of feeding the liquid oxygen 32 directly into the electric field device 4, it could be once passed through the heat insulative casing 10 or it could be dropped down on the outer peripheral wall of the electric field device 4 within the heat insulative casing 10, to cool the cooling fins 20 of the electric field device 4, and at the same time the liquid oxygen 32 could be evaporated there into a pure oxygen gas to be fed into the electric field device 4.

As a matter of course, in this case liquid air could be employed in place of the liquid oxygen.

However, when the liquid oxygen 32 is fed as shown in FIG. 3, since the produced gas does not contain nitrogen, the ozone generating efficiency can be raised by the corresponding amount as compared to the case where liquid air is fed.

It is to be noted that in FIG. 3, the component parts designated by the same reference numeral as those shown as FIGS. 1 and 2 have like component names and like functions.

Still further, upon cooling the electric field device 4 and the gas to be ozonized in FIG. 1, it is especially economical to carry out the cooling by making use of evaporation latent heat of a liquid natural gas through the step of directly bringing the liquid natural gas into contact with the outer wall of the electric field device 4 and the outer wall of the feed pipe 1 (finned) of the gas to be ozonized, or through the steps of once cooling an appropriate coolant medium with the liquid natural gas and then bringing the low-temperature coolant medium into contact with the outer wall of the electric field device 4 and the outer wall of the feed pipe 1.

Furthermore, while in the above-described electric field device 4, the linear discharge electrode 17 and the two-dimensional induction electrode 18 were disposed in an opposed relationship with the dielectric 16 intervening therebetween, the high-frequency high-voltage power supply 19 was connected between these respective electrodes 17 and 18, and thereby the silent discharge generating region 5 was formed in the space close to the linear discharge electrodes 17 on the inner surface of the dielectric 14 in place of such structure a dielectric 46 and a silent discharge generating region 45 could be provided without any demerit between a two-dimensional discharge electrode 47 and another two-dimensional induction electrode 48 as seen in an electric field device 44 of a modified embodiment shown in FIGS. 4 and 5. In this modified embodiment, a gas to be ozonized such as liquid air 42 or the like is fed to the silent discharge generating region, and the electric field device 44 and the silent discharge generating region 45 are cooled by passing a refrigerant 43 such as a liquefied gas through the outside 40 and the inside 41 of the electric field device 44.

What is claimed is:

1. A method for producing an ozone gas, characterized in that ozonization is effected within an electric field device comprising a cylindrical dielectric body formed from an alumina ceramic, said cylindrical dielectric body being provided with a cylindrical induction electrode disposed therein and a plurality of linear discharge electrodes disposed in a parallel array on the inner surface of said cylindrical dielectric body to generate a surface corona discharge region along the inner surface of the cylindrical dielectric body, while a density of a gas to be ozonized in said surface corona discharge region of said cylindrical dielectric body is kept higher than the density of said gas to be ozonized in the standard state.

2. A method for producing an ozone gas as claimed in claim 1, characterized in that the gas to be ozonized having the higher density is obtained by maintaining said gas at a lower temperature than the temperature in the standard state.

3. A method for producing an ozone gas as claimed in claim 1, characterized in that the gas to be ozonized having the higher density is obtained by maintaining said gas at a higher pressure than the pressure in the standard state.

4. A method for producing an ozone gas as claimed in claim 1, characterized in that the gas to be ozonized having the higher density is obtained by maintaining said gas at a lower temperature and at a higher pressure than the temperature and pressure, respectively, in the standard state.

5. A method for producing an ozone gas as claimed in claim 1, characterized in that the gas to be ozonized is air.

6. A method for producing an ozone gas as claimed in claim 1, characterized in that the gas to be ozonized is an oxygen gas.

7. A method for producing an ozone gas as claimed in claim 1, in which feeding of the gas to be ozonized having the higher density into the silent discharge generating region of the electric field device consists of the steps of introducing liquid oxygen to the interior of of said electric field device, and exhausting an evaporated oxygen gas.

8. A method for producing an ozone gas as claimed in claim 1, characterized in that feeding of the gas to be ozonized having the higher density into the silent discharge generating region of the electric field device consists of the steps of introducing liquid air to the interior of said electric field device, and exhausting evaporated air.

9. A method for producing an ozone gas as claimed in claim 1, characterized in that feeding of the gas to be ozonized having the higher density into the silent discharge generating region of the electric field device consists of the step of refrigerating the gas to be ozonized in the silent discharge generating region from the outside and/or inside of the electric field device.

10. An ozonizer comprising an electric field device in which a cylindrical dielectric body formed from an alumina ceramic is provided, said cylindrical dielectric body being provided with a cylindrical induction electrode disposed therein and a plurality of linear discharge electrodes disposed in a parallel array on the inner surface of said cylindrical dielectric body to generate a surface corona discharge region along the inner surface of the cylindrical dielectric body, and density increasing means for increasing a density of a gas to be ozonized in said surface corona discharge generating region of said electric field device to a higher density than that in the standard state.

11. An ozonizer as claimed in claim 10, characterized in that said density increasing means is a cooling device for the gas to be ozonized.

12. An ozonizer as claimed in claim 11, characterized in that said cooling device for the gas to be ozonized is provided on the outside and/or inside of the electric field device.

13. An ozonizer as claimed in claim 11, characterized in that said cooling device for the gas to be ozonized is provided on the outside of a feed pipe of the gas to be ozonized.

14. An ozonizer as claimed in claim 11, characterized in that said cooling device for the gas to be ozonized relies upon utilization of latent heat of a liquefied gas.

15. An ozonizer as claimed in claim 10, characterized in that said density increasing means is a pressurizing device for the gas to be ozonized.

16. An ozonizer as claimed in claim 10, characterized in that said density increasing means makes use of cooling by evaporation of liquid air, and low-temperature air produced by the evaporation is used as the gas to be ozonized.

17. An ozonizer as claimed in claim 10, characterized in that said density increasing means makes use of cooling by evaporation of liquid oxygen, and low-temperature oxygen produced by the evaporation is used as the gas to be ozonized.

18. An ozonizer as claimed in claim 10, characterized in that said density increasing means consists of both a cooling device and a pressurizing device.

* * * * *